US012595362B2

(12) United States Patent
Jeon et al.

(10) Patent No.: US 12,595,362 B2
(45) Date of Patent: Apr. 7, 2026

(54) POLYPROPYLENE RESIN COMPOSITION WITH EXCELLENT FLAME RETARDANCY AND FORMABILITY

(71) Applicants: Hyundai Motor Company, Seoul (KR); Kia Corporation, Seoul (KR); Hanwha TotalEnergies Petrochemical Co., Ltd., Seosan-si (KR)

(72) Inventors: Sangsoo Jeon, Anyang-si (KR); Jeonggil Ko, Seoul (KR); Yongki Hwang, Pyeongtaek-si (KR)

(73) Assignees: Hyundai Motor Company, Seoul (KR); Kia Corporation, Seoul (KR); Hanwha TotalEnergies Petrochemical Co., Ltd., Seosan-Si (KR)

( * ) Notice: Subject to any disclaimer, the term of this patent is extended or adjusted under 35 U.S.C. 154(b) by 518 days.

(21) Appl. No.: 18/345,575

(22) Filed: Jun. 30, 2023

(65) Prior Publication Data

US 2024/0076483 A1 Mar. 7, 2024

(30) Foreign Application Priority Data

Aug. 24, 2022 (KR) ........................ 10-2022-0106183

(51) Int. Cl.
| | |
|---|---|
| *C08L 23/12* | (2006.01) |
| *C08F 222/06* | (2006.01) |
| *C08K 5/14* | (2006.01) |
| *C08K 5/3462* | (2006.01) |
| *C08K 5/521* | (2006.01) |
| *C08K 7/14* | (2006.01) |
| *C08L 27/18* | (2006.01) |
| *C08L 33/12* | (2006.01) |
| *C08L 51/06* | (2006.01) |
| *C08L 85/02* | (2006.01) |

(52) U.S. Cl.
CPC ............ *C08L 23/12* (2013.01); *C08F 222/06* (2013.01); *C08K 5/14* (2013.01); *C08K 5/3462* (2013.01); *C08K 5/521* (2013.01); *C08K 7/14* (2013.01); *C08L 27/18* (2013.01); *C08L 33/12* (2013.01); *C08L 51/06* (2013.01); *C08L 85/02* (2013.01); *C08K 2201/003* (2013.01); *C08K 2201/004* (2013.01); *C08K 2201/014*

(2013.01); *C08L 2201/02* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 6,869,982 B2 | 3/2005 | Dang et al. | |
| 6,992,129 B2 | 1/2006 | Benson et al. | |
| 8,846,789 B2 | 9/2014 | Kim et al. | |
| 10,752,761 B2 | 8/2020 | Jang et al. | |
| 2007/0155884 A1 | 7/2007 | Pellegatti et al. | |
| 2021/0171734 A1* | 6/2021 | Sakamoto | B32B 27/36 |
| 2022/0315742 A1* | 10/2022 | Sakamoto | C08K 3/22 |

FOREIGN PATENT DOCUMENTS

| | | | |
|---|---|---|---|
| JP | 6367870 B2 | 8/2018 | |
| KR | 100509908 B1 | 8/2005 | |
| KR | 100808721 B1 | 2/2008 | |
| KR | 20100027316 A | 3/2010 | |
| KR | 20100080338 A | 7/2010 | |
| KR | 101425285 B1 | 8/2014 | |
| KR | 20170079185 A | 7/2017 | |
| KR | 20190075199 A | 7/2019 | |
| KR | 102084860 B1 | 3/2020 | |
| KR | 102268848 B1 | 6/2021 | |
| KR | 20220042700 A | 4/2022 | |

* cited by examiner

*Primary Examiner* — Sheeba Ahmed

(74) *Attorney, Agent, or Firm* — Slater Matsil, LLP

(57) ABSTRACT

An embodiment polypropylene resin composition includes, based on a total weight thereof, a highly crystalline polypropylene resin at 20-50 wt % of the total weight, the highly crystalline polypropylene resin having an isotactic pentad fraction, measured according to the $C^{13}$-NMR method, of 96% or more, a highly flowable polypropylene resin at 5-15 wt % of the total weight, a glass fiber at 10-35 wt % of the total weight, the glass fiber having an average diameter of 5-15 μm and an average length of 1-16 mm, a glass wool at 1-5 wt % of the total weight, the glass wool having an average diameter of 1-6 μm and an average length of 30-300 μm, a phosphate flame retardant at 15-25 wt % of the total weight, a fluorine flame retardant aid at 0.1-0.4 wt % of the total weight, and a compatibilizer at 1-4 wt % of the total weight.

20 Claims, 4 Drawing Sheets

POLYPROPYLENE RESIN COMPOSITION WITH EXCELLENT FLAME RETARDANCY AND FORMABILITY

CROSS-REFERENCE TO RELATED APPLICATIONS

This application claims the benefit of Korean Patent Application No. 10-2022-0106183, filed on Aug. 24, 2022, which application is hereby incorporated herein by reference.

TECHNICAL FIELD

The present disclosure relates to a polypropylene resin composition with excellent flame retardancy and formability.

BACKGROUND

With the recent trend of high performance, high integration, high output, and compact size of vehicles and various electronic industries, operating temperature is rising and energy density is gradually increasing, and increases in heat generation caused thereby raise the risk of fire in various fields. Particularly, fire may lead to an explosion accident in the case of batteries for electric vehicles, and thus properties of preventing ignition or slowing further development of ignition are required to avoid such big fires. That is, there is a need to develop a polypropylene resin composition having excellent properties of stopping fire or slowing further development of combustion of a product even when a fire breaks out by providing flame retardancy to materials of end plates, top covers, side covers, and busbar housings of a battery module surrounding battery cells, and simultaneously having excellent formability and excellent exterior quality of a final product.

SUMMARY

An embodiment of the disclosure provides a polypropylene resin composition exhibiting excellent flame retardancy, mechanical properties, and formability without using antimony oxide. In this case, in the resin composition, high flame retardancy was obtained by combining a phosphate compound and a fluorine flame retardant aid. To realize high mechanical properties and excellent formability, highly crystalline polypropylene with high crystallinity and wide molecular weight distribution is combined with glass fiber and glass wool, thereby reducing warpage.

Additional embodiments of the disclosure will be set forth in part in the description which follows and, in part, will be obvious from the description, or may be learned by practice of the disclosure.

In accordance with an embodiment of the disclosure, a polypropylene resin composition with excellent flame retardancy and formability includes the following components A-1 to E based on a total weight thereof:

(A-1) 20 to 50 wt % of a highly crystalline polypropylene resin having an isotactic pentad fraction, measured according to the $C^{13}$-NMR method, of 96% or more;

(A-2) 5 to 15 wt % of a highly flowable polypropylene resin;

(B-1) 10 to 35 wt % of a glass fiber having an average diameter of 5 to 15 μm and an average length of 1 to 16 mm;

(B-2) 1 to 5 wt % of a glass wool having an average diameter of 1 to 6 μm and an average length of 30 to 300 μm;

(C) 20 to 30 wt % of a phosphate flame retardant;

(D) 0.1 to 0.4 wt % of a fluorine flame retardant aid; and (E) 1 to 4 wt % of a compatibilizer.

BRIEF DESCRIPTION OF THE DRAWINGS

These and/or other embodiments of the disclosure will become apparent and more readily appreciated from the following description of exemplary embodiments, taken in conjunction with the accompanying drawings, of which.

DETAILED DESCRIPTION OF ILLUSTRATIVE EMBODIMENTS

Figure 1:
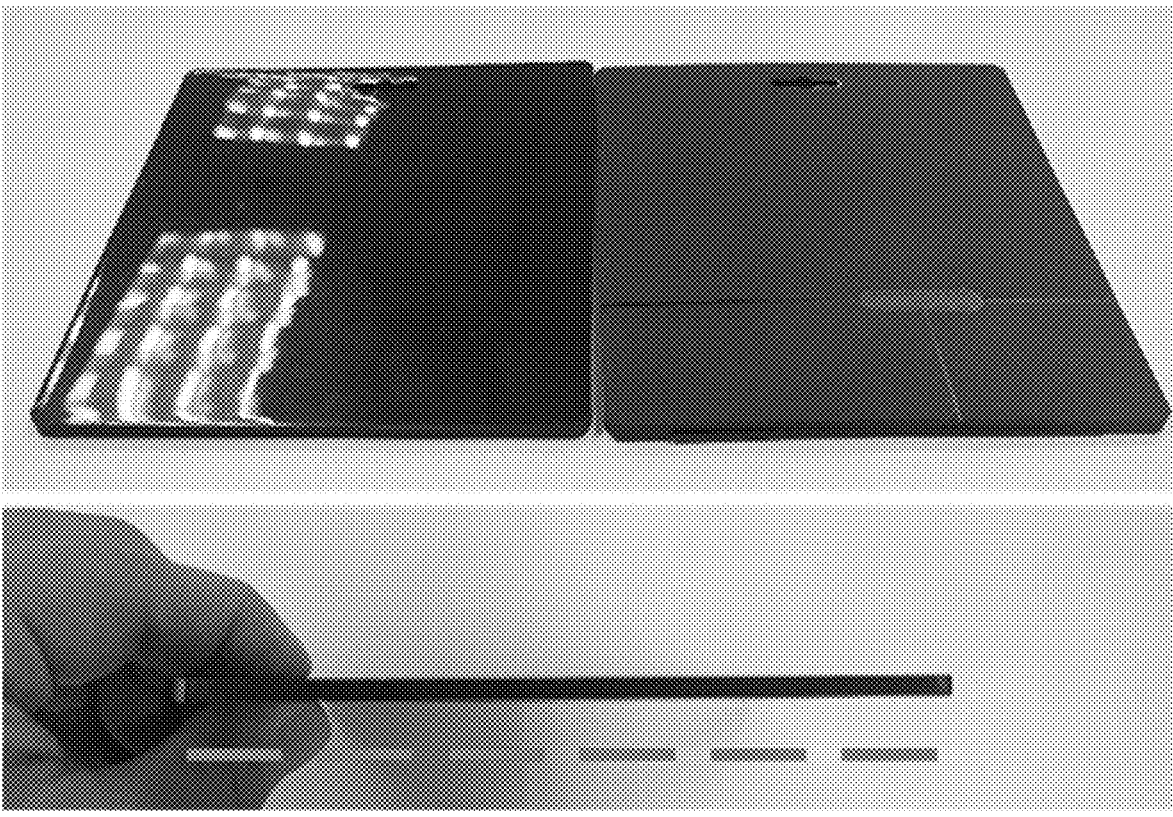
FIG. 1 is a photograph showing warpage of a molded specimen of Example 1.

Reference will now be made in detail to the embodiments of the disclosure, examples of which are illustrated in the accompanying drawings, wherein like reference numerals refer to like elements throughout.

However, embodiments of the present disclosure may be embodied in many different forms and should not be construed as being limited to the embodiments set forth herein. Rather, these embodiments are provided so that this disclosure will be thorough and complete and will fully convey the scope of the disclosure to those skilled in the art.

The terms used herein are merely used to describe particular embodiments. Thus, an expression used in the singular encompasses the expression of the plural, unless it has a clearly different meaning in the context. In addition, it is to be understood that the terms such as "including" or "having" are intended to indicate the existence of features, steps, functions, components, or combinations thereof disclosed in the specification and are not intended to preclude the possibility that one or more other features, steps, functions, components, or combinations thereof may exist or may be added.

Meanwhile, unless otherwise defined, all terms used herein have the same meaning as those commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

In addition, the terms "about", "substantially", etc. used throughout the specification mean that when a natural manufacturing and substance allowable error are suggested, such an allowable error corresponds to a value or is similar to the value, and such values are intended for the sake of clear understanding of embodiments of the present disclosure or to prevent an unconscious infringer from illegally using the disclosure of embodiments of the present disclosure. The embodiments described in the specification and shown in the drawings are only illustrative and are not intended to represent all embodiments of the disclosure, such that various modifications may be made without departing from the spirit of the disclosure.

In addition, the terms used in the present disclosure are merely used to describe embodiments and are not intended to limit the present disclosure. An expression used in the singular encompasses the expression of the plural, unless it has a clearly different meaning in the context. Also, an order of operations performed by the methods according to embodiments of the disclosure may be changed unless there is a particular description about the order of operations.

A polypropylene resin composition with excellent flame retardancy and formability according to an embodiment of the present disclosure includes the following components A-1 to E based on a total weight thereof:

(A-1) 20 to 50 wt % of a highly crystalline polypropylene resin having an isotactic pentad fraction, measured according to the $C^{13}$-NMR method, of 96% or more;

(A-2) 5 to 15 wt % of a highly flowable polypropylene resin;

(B-1) 10 to 35 wt % of a glass fiber having an average diameter of 5 to 15 μm and an average length of 1 to 16 mm;

(B-2) 1 to 5 wt % of a glass wool having an average diameter of 1 to 6 μm and an average length of 30 to 300 μm;

(C) 20 to 30 wt % of a phosphate flame retardant;

(D) 0.1 to 0.4 wt % of a fluorine flame retardant aid; and (E) 1 to 4 wt % of a compatibilizer.

Hereinafter, each of the components will be described in more detail.

A-1: Highly Crystalline Polypropylene Resin

The highly crystalline polypropylene resin A-1, which is a highly crystalline polypropylene resin having an isotactic pentad fraction, measured according to the $C^{13}$-NMR method, of 96% or more and a polydispersity index lower than 5, has a melt index of 20 to 50 g/10 min. The highly crystalline polypropylene resin A-1 has excellent mechanical rigidity due to high crystallinity and reduces a forming time by decreasing a cooling time due to quick crystal induction during a cooling process. Particularly, in the case where the melt index of the highly crystalline polypropylene resin A-1 is from 20 to 50 g/10 min, fluidity of the resin composition is suitable for formation. In the case where the polydispersity index is lower than 5, impact property and rigidity of a molded product may be uniformly exhibited, and the content of the polypropylene resin may be from 20 to 50 wt % based on a total weight. With less than 20 wt % of the highly crystalline polypropylene resin A-1, inherent properties of the polypropylene resin deteriorate to lower functionality of the entire composition, and it is difficult to manufacture a molded product because formation is not easy. On the contrary, with greater than 50 wt % of the highly crystalline polypropylene resin A, flame retardancy of a product may deteriorate.

A-2: Highly Flowable Polypropylene Resin

The highly flowable polypropylene resin A-2 is a polypropylene resin reformed via reaction with peroxydicarbonate that is an organic peroxide to have improved fluidity and has a melt index of 500 to 1000 g/10 min. In this regard, the organic peroxide includes 0.05 to 5 parts by weight of peroxydicarbonate based on 100 parts by weight of the polypropylene resin, and the content of the reformed polypropylene resin is from 5 to 15 wt % based on the total weight. With less than 5 wt % of the highly flowable polypropylene resin A-2 of embodiments of the present disclosure, fluidity may decrease resulting in deterioration of formability and defective appearance. With greater than 15 wt % of the highly flowable polypropylene resin A-2, mechanical properties may deteriorate.

The peroxydicarbonate-based organic peroxide may be represented by Formula 1 below.

$$R^1—OC(O)OOC(O)O—R^2 \qquad \text{Formula 1:}$$

In Formula 1, $R^1$ and $R^2$ are each independently $CH_3$, $C_2H_5CH(CH_3)$, $Cl_3CC(CH_3)_2$, $C_7H_{15}$, c-$C_6H_{11}CH_2$, $Cl_3Si$ $(CH_2)_3$, $CH_3CH(OCH_3)CH_2CH_2$, $C_6H_5OCH_2CH_2$, $C_6H_5CH_2$, Z—$C_8H_{17}CH{=}CH(CH_2)_8$, $(CH_3)_2CHCH_2CH$ $(CH_3)$, $Cl_3C$, CHCH(Cl), $ClCH_2$, $[C_2H_5OC(O)]_2CH(CH_3)$, $C_8H_{17}$, $C_2H_5$, $C_{18}H_{37}$, or 2-oxo-1,3-dioxolane-4-$CH_2$. More specifically, the peroxydicarbonate-based organic peroxide may include at least one selected from the group consisting of diethyl peroxydicarbonate, dipropyl peroxydicarbonate, isopropyl peroxydicarbonate, dibutyl peroxydicarbonate, diethylhexyl peroxydicarbonate, dioctyl peroxydicarbonate, ditetrabutylcyclohexyl peroxydicarbonate, dimyristyl peroxydicarbonate, and dicetyl peroxydicarbonate.

B-1: Glass Fiber

The glass fiber B-1, as an inorganic reinforcement, is a fiber having an average diameter of 5 to 15 μm and chopped to an average length of 1 to 16 mm and the content of the glass fiber B-1 is from 10 to 35 wt %. A glass fiber surface-treated with aminosilane has an average diameter of 9 to 13 μm and a length of 3.0 to 4.5 mm. In this case, with less than 10 wt % of the glass fiber B-1, a molded product does not have sufficient rigidity and has reduced resistance to warpage. With greater than 35 wt % of the glass fiber B-1, physical properties, such as impact strength, of a molded product may deteriorate resulting in fracture by an external force. The glass fiber B-1 having an average diameter of 5 to 15 μm and an average length of 1 to 16 mm is efficient to improve mechanical properties of the polypropylene resin composition.

B-2: Glass Wool

The glass wool B-2, as an inorganic reinforcement, is a glass wool having an average diameter of 1 to 6 μm and an average length of 30 to 300 μm, and the content of the glass wool B-2 is from 1 to 5 wt %. Glass wool, which is a material manufactured by melting glass at a high temperature and obtaining a fiber having a very small diameter therefrom using fast centrifugal force, is smaller in diameter and more flexible than a glass fiber, and thus less deformation is caused, and thin films are easily formed. In addition, the glass wool B-2 has high thermal resistance and scratch resistance resulting in obtaining an excellent exterior appearance. Meanwhile, when the average diameter of the glass wool B-2 is less than 1 μm, workability deteriorates resulting in a decrease in productivity, and it not preferable for a working environment. On the contrary, when the average diameter exceeds 6 μm, appearance of a molded product may deteriorate. When the content of the glass wool B-2 is from 1 to 5 wt %, excellent resistance to warpage and excellent thermal resistance and scratch resistance may be obtained resulting in excellent appearance after formation.

C: Phosphate Flame Retardant

The phosphate flame retardant C, as a phosphorus-based flame retardant, may be a polyphosphate or piperazine acid polyphosphate compound, and the content of the phosphate flame retardant C may be from 15 to 25 wt % based on the total weight. Meanwhile, with less than 15 wt % of the phosphate flame retardant C, flame retardancy may deteriorate. On the contrary, with greater than 25 wt % of the phosphate flame retardant C, mechanical properties may deteriorate.

D: Fluorine Flame Retardant Aid

The fluorine flame retardant aid D may be a mixture of a fluorine resin and a methyl methacrylate polymer. In addition, the fluorine resin may be polytetrafluoroethylene, polyvinylidene fluoride, a copolymer of tetrafluoroethylene and vinylidene fluoride, a copolymer of tetrafluoroethylene and fluoroalkyl vinyl ether, and a copolymer of tetrafluoroethylene, and hexafluoropropylene which may be used independently or in a combination of at least two thereof.

In addition, the fluorine flame retardant aid D according to embodiments of the present disclosure, as a mixture of polytetrafluoroethylene and a methyl methacrylate polymer, may be added in an amount of 0.1 to 0.4 wt %. In a process of mixing the fluorine compound with a resin and extruding the mixture for anti-dripping during fire, the fluorine compound forms a fibrillar network in the resin, resulting in a decrease in a flow viscosity of the resin and an increase in a shrinkage rate to prevent a dripping phenomenon of the resin. Meanwhile, with less than 0.1 wt % of the fluorine flame retardant aid D, the anti-dripping property decreases resulting in deterioration of flame retardancy, and with greater than 0.5 wt % of the fluorine flame retardant aid D, fluidity may deteriorate resulting in defects in formation.

E: Compatibilizer

The compatibilizer E is a maleic anhydride-grafted polypropylene (PP-g-MAH) with a maleic anhydride graft ratio of 0.01 to 20 parts by weight and has a melt index of 80 to 150 g/10 min. The compatibilizer E is a homopolymer or copolymer of propylene grafted with maleic anhydride. In the case where the melt index of the compatibilizer E is from 80 to 150 g/10 min, fluidity of the resin composition is suitable for formation, and a molded product having excellent mechanical properties may be manufactured. The content of the compatibilizer may be from 1 to 4 wt % based on the total weight. Meanwhile, with less than 1 wt % of the compatibilizer E, binding strength of the components constituting the composition deteriorates resulting in deterioration of mechanical properties and defects such as pores. On the contrary, with greater than 4 wt % of the compatibilizer, fluidity deteriorates resulting in deterioration of formability and defective appearance.

In addition, a polypropylene resin composition according to another embodiment of the present disclosure may have a tensile strength of 80 MPa or more.

In addition, a polypropylene resin composition according to another embodiment of the present disclosure may have an impact strength of 7.5 kJ/m² or more.

Only when the tensile strength is 80 MPa or more and the impact strength is 7.5 kJ/m² or more, the polypropylene resin composition with excellent flame retardancy and formability according to embodiments of the present disclosure is suitable for use as a material for plastic injection molded parts such as a module housing in battery packs of hybrid vehicles, plug-in-hybrid vehicles, and electric vehicles.

Examples

Hereinafter, embodiments of the present disclosure will be described in more detail with reference to the following examples and comparative examples. However, the following examples are merely presented to exemplify embodiments of the present disclosure, and the scope of the present disclosure is not limited thereto.

Resins and compounds used in examples and comparative examples are as follows:

Highly crystalline polypropylene resin A-1: a propylene homopolymer resin (melt index of 22 g/10 min, polydispersity index of 4.7, and isotactic pentad fraction of 96.2%)

Highly flowable polypropylene resin A-2: a polypropylene resin composition having improved fluidity by reforming a polypropylene resin via reaction with 0.05 to 5 parts by weight of peroxydicarbonate (melt index of 1000 g/10 min) based on 100 parts by weight of the polypropylene resin A-2

Glass fiber B-1: chopped glass fiber (average diameter of 5 to 15 μm and average length of 1 to 16 mm)

Glass wool B-2: glass wool (average diameter of 1 to 6 μm and average length of 30 to 300 μm)

Inorganic reinforcement talc B-3: talc (planar talc, diameter of 3 to 5 μm)

Phosphate flame retardant C-1: piperazine acid polyphosphate compound

Ammonium phosphate flame retardant C-2: ammonium polyphosphate compound

Fluorine flame retardant aid D: mixture of polytetrafluoroethylene and methyl methacrylate polymer Compatibilizer E: maleic anhydride-grafted polypropylene (melt index of 100 g/10 min with a maleic anhydride graft ratio of 0.01 to 20 parts by weight)

Preparation Examples

Resins and compounds, the types and contents of which are shown in Table 1 below (unit: parts by weight), were melt-blended in a twin-screw extruder at a temperature of 180 to 220° C. to prepare pellets. Subsequently, specimens for mechanical property measurement and appearance test were prepared using an injection molding machine (ENGEL 180T). Injection conditions of a temperature of 210° C., a pressure of 55 bar, a speed of 30 mm/s, a time of 6 sec, a cooling time of 40 sec, and a mold temperature of 55° C. were maintained.

TABLE 1

| Composition | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Highly crystalline polypropylene resin A-1 | 33.7 | 44.7 | 43.7 | 56.7 | 44 | 33.7 | 39.7 |
| Highly flowable polypropylene resin A-2 | 10 | 10 | — | — | — | 10 | 14 |
| Glass fiber B-1 | 28 | 18 | 31 | — | 31 | 31 | 28 |
| Glass wool B-2 | 3 | 3 | — | — | — | — | 3 |
| Talc B-3 | — | — | — | 21 | — | — | — |
| Phosphate flame retardant C-1 | 22 | 22 | 22 | — | 22 | 22 | 12 |
| Ammonium polyphosphate flame retardant C-2 | — | — | — | 22 | — | — | — |

TABLE 1-continued

| Composition | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Fluorine flame retardant aid D | 0.3 | 0.3 | 0.3 | 0.3 | — | 0.3 | 0.3 |
| Compatibilizer E | 3 | 2 | 3 | — | 3 | 3 | 3 |

Experimental Examples

The polypropylene resin compositions respectively obtained in the examples and comparative examples and injection-molded specimens obtained therefrom were tested according to the following methods. The results are shown in Table 2 below.

(1) Melt index: Melt index was measured according to the ISO 1133 standard test method. However, a cylinder temperature was 230° C., and a load was 2.16 kgf.

(2) Tensile strength: Tensile strength was measured according to the ISO 527 standard test method, except that ISO3167 type A specimen was used and a speed was 5 mm/min. In this case, excellent tensile strength was obtained at 80 MPa or higher.

(3) Izod impact strength: Izod impact strength was measured according to the ISO 180 standard test method, except that a size of the specimen was 800×10×4 mm, and a notched specimen was used. In this case, at an Izod impact strength of 7.5 kJ/m$^2$ or more, excellent impact strength was obtained.

(4) Flame retardancy-Flame retardancy was measured according to the ASTM D3801 (UL94) standard test method, except that a thickness of the specimen was 1.5 mm.

(5) Formability: Formability was evaluated by maintaining a 13×130 mm injection-molded flat specimen at room temperature for 48 hours, and then placing the specimen on a flat surface and visually evaluating the degree of warpage and appearance. In this case, the degree of warpage was evaluated as "excellent" in the case where warpage was maintained within 10 mm from the surface, as "fair" in the case where warpage was maintained more than 10 mm and equal to or less than 20 mm, and as "poor" in the case where warpage was maintained above 20 mm.

and 4 because the highly flowable polypropylene resin A-2 and the glass wool B-2 were not contained therein.

In addition, it was confirmed that the specimen of Comparative Example 2 could not obtain desired mechanical properties and had fair formability due to the tensile strength of 30 MPa and the impact strength of 4 kJ/m$^2$, because the content of the highly crystalline polypropylene resin A-1 exceeded 50%, only talc B-3, instead of glass fiber B-1 and glass wool B2, was contained as the inorganic reinforcement, only the ammonium polyphosphate compound C-2 was contained as the flame retardant, and the compatibilizer E was not contained therein.

Furthermore, it was confirmed that the specimen of Comparative Example 3 had flame retardancy of V-2 and poor formability because the highly flowable polypropylene resin A-2, the glass wool B-2, and the fluorine flame retardant aid D were not contained therein.

Also, it was confirmed that the specimen of Comparative Example 4 had poor formability because the glass wool B-2 was not contained therein, and the specimen of Comparative Example 5 had flame retardancy of V-2 because the content of the phosphate flame retardant C-1 was less than 15%.

The polypropylene flame retardant resin composition of embodiments of the present disclosure has excellent flame retardancy and mechanical properties and, particularly, has excellent formability so as to be effectively used in the formation of large-sized injection-molded parts or thin films. In addition, the polypropylene flame retardant resin composition may be classified as an eco-friendly flame retardant material by using a phosphate flame retardant without using a conventional toxic halogen flame retardant resin. By using glass wool, which is smaller in diameter and more flexible than glass fiber, warpage may be reduced during a forming process and excellent exterior appearance may be obtained, and thus the polypropylene flame retardant resin composition may be applicable to various fields such as electric and

TABLE 2

| Item | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Melt index of resin composition (g/10 min) | 8 | 10 | 3 | 7 | 3 | 9 | 10 |
| Tensile strength (MPa) | 105 | 85 | 100 | 30 | 102 | 101 | 108 |
| Izod impact strength (kJ/m$^2$) | 9.2 | 8.5 | 9.3 | 4 | 9.0 | 9.2 | 9.6 |
| Flame retardancy (UL94 vertical burning) | V-0 | V-0 | V-0 | V-0 | V-2 | V-0 | V-2 |
| Formability (warpage, appearance) | Excellent | Excellent | Poor | Fair | Poor | Poor | Excellent |

Figure 2:
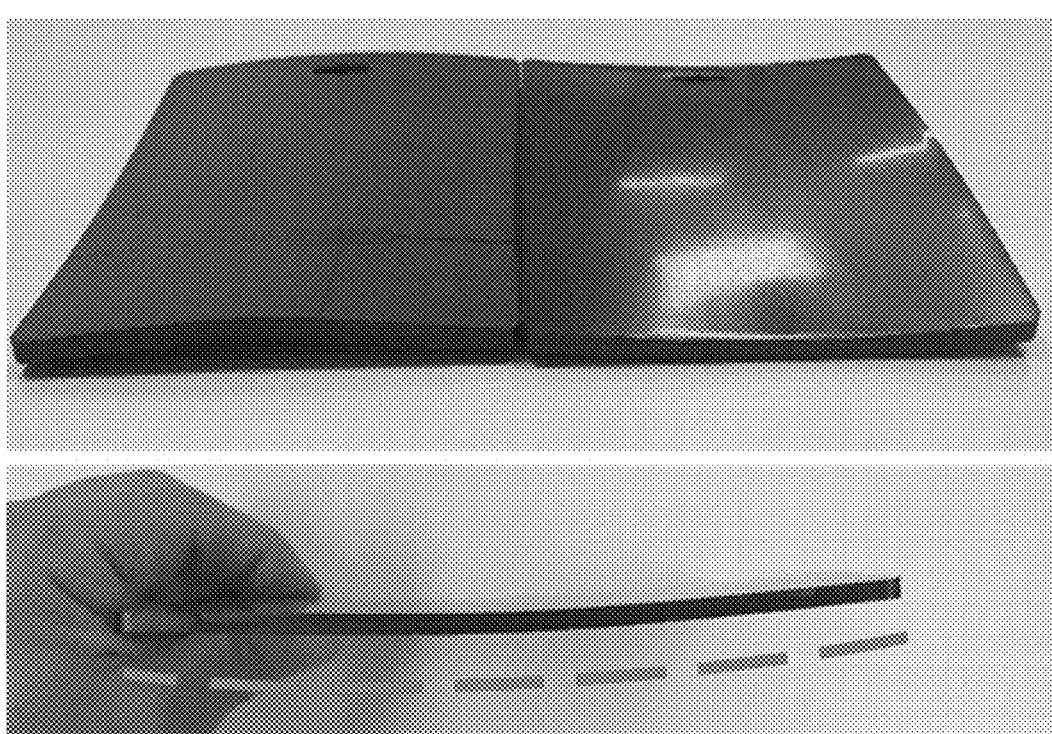
FIG. 2 is a photograph showing warpage of a molded specimen of Comparative Example 1.
Figure 3:
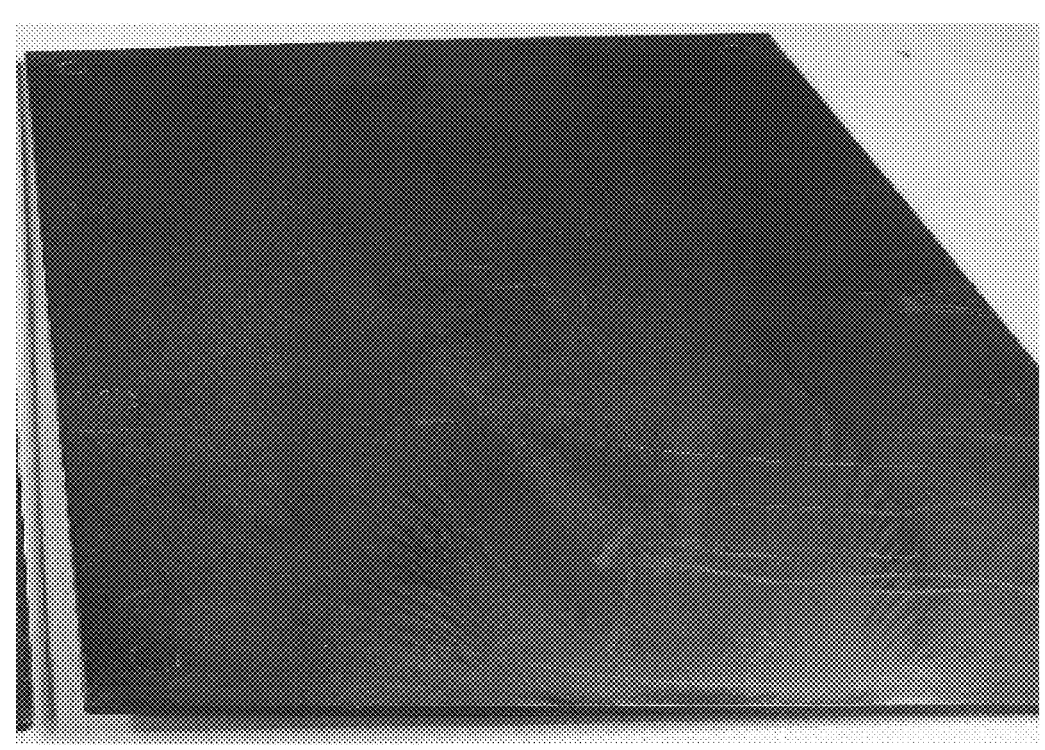
FIG. 3 is a photograph showing an exterior appearance of a molded specimen of Example 1.
Figure 4:
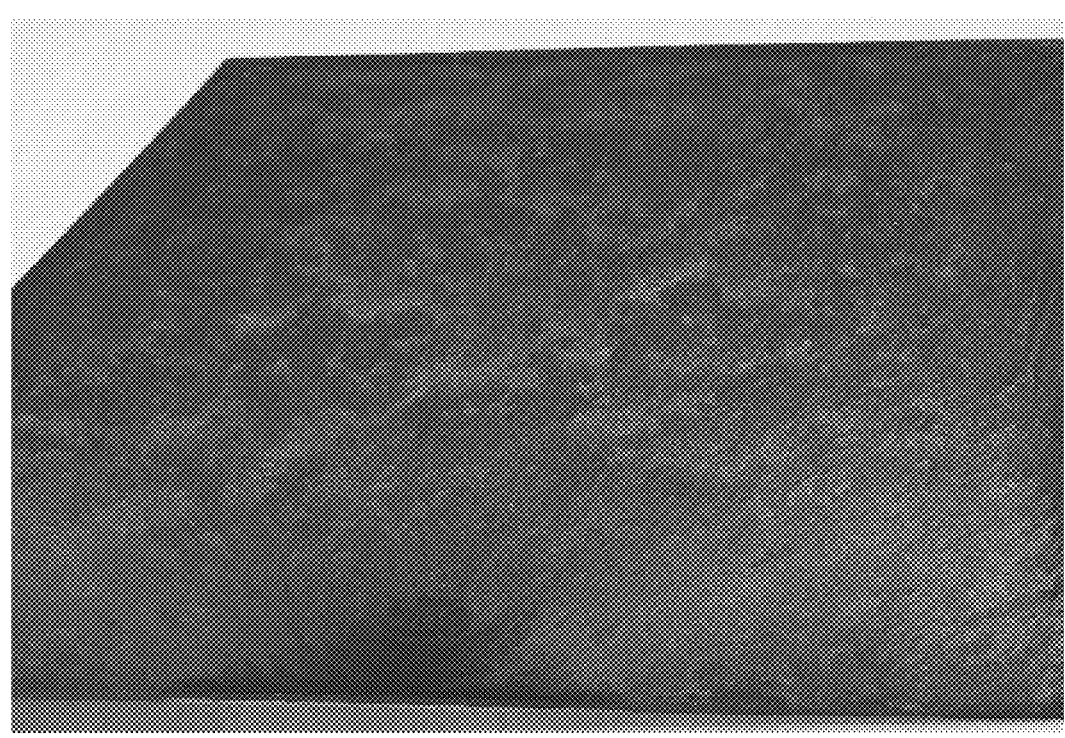
FIG. 4 is a photograph showing an exterior appearance of a molded specimen of Comparative Example 1.

It was confirmed that the specimens of Examples 1 and 2 satisfying the ranges of embodiments of the present disclosure in Table 1 satisfied the tensile strength of 80 MPa or more, the impact strength of 7.5 kJ/m$^2$ or more, excellent flame retardancy of V-0, and excellent formability as shown in FIGS. 1 to 3.

On the contrary, it was confirmed that Comparative Example 1 exhibited poor formability as shown in FIGS. 2 electronic parts and construction materials as well as vehicles and light-weight property and economically feasibility may be obtained.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A polypropylene resin composition comprising, based on a total weight thereof:
   a highly crystalline polypropylene resin at 20 to 50 wt % of the total weight, the highly crystalline polypropylene resin having an isotactic pentad fraction, measured according to the $C^{13}$-NMR method, of 96% or more;
   a highly flowable polypropylene resin at 5 to 15 wt % of the total weight;
   a glass fiber at 10 to 35 wt % of the total weight, the glass fiber having an average diameter of 5 to 15 μm and an average length of 1 to 16 mm;
   a glass wool at 1 to 5 wt % of the total weight, the glass wool having an average diameter of 1 to 6 μm and an average length of 30 to 300 μm;
   a phosphate flame retardant at 15 to 25 wt % of the total weight;
   a fluorine flame retardant aid at 0.1 to 0.4 wt % of the total weight; and
   a compatibilizer at 1 to 4 wt % of the total weight.

2. The polypropylene resin composition according to claim 1, wherein the highly crystalline polypropylene resin has a melt index of 20 to 50 g/10 min.

3. The polypropylene resin composition according to claim 1, wherein the highly flowable polypropylene resin is reformed by reaction with peroxydicarbonate.

4. The polypropylene resin composition according to claim 3, wherein the peroxydicarbonate is represented by Formula 1 below:

$$R^1\text{—}OC(O)OOC(O)O\text{—}R^2, \qquad \text{[Formula 1]}$$

in Formula 1, $R^1$ and $R^2$ are each independently $CH_3$, $C_2H_5CH(CH_3)$, $Cl_3CC(CH_3)_2$, $C_7H_{15}$, $C\text{—}C_6H_{11}CH_2$, $Cl_3Si(CH_2)_3$, $CH_3CH(OCH_3)CH_2CH_2$, $C_6H_5OCH_2C$ $H_2$, $C_6H_5CH_2$, $Z\text{—}C_8H_{17}CH\text{=}CH(CH_2)_8$, $(CH_3)_2$ $CHCH_2CH(CH_3)$, $Cl_3C$, $CHCH(Cl)$, $ClCH_2$, $[C_2H_5OC$ $(O)]_2CH(CH_3)$, $C_8H_{17}$, $C_2H_5$, $C_{18}H_{37}$, or 2-oxo-1,3-dioxolane-4-$CH_2$.

5. The polypropylene resin composition according to claim 3, wherein the peroxydicarbonate comprises at least one compound selected from the group consisting of diethyl peroxydicarbonate, dipropyl peroxydicarbonate, isopropyl peroxydicarbonate, dibutyl peroxydicarbonate, diethylhexyl peroxydicarbonate, dioctyl peroxydicarbonate, ditetrabutyl-cyclohexyl peroxydicarbonate, dimyristyl peroxydicarbonate, and dicetyl peroxydicarbonate.

6. The polypropylene resin composition according to claim 3, wherein a content of the peroxydicarbonate is from 0.05 to 5 parts by weight based on 100 parts by weight of the highly flowable polypropylene resin.

7. The polypropylene resin composition according to claim 1, wherein the highly flowable polypropylene resin has a melt index of 500 to 1000 g/10 min.

8. The polypropylene resin composition according to claim 1, wherein the phosphate flame retardant comprises polyphosphate or piperazine acid polyphosphate.

9. The polypropylene resin composition according to claim 1, wherein the fluorine flame retardant aid comprises a mixture of a fluorine resin and a methyl methacrylate polymer.

10. The polypropylene resin composition according to claim 9, wherein the fluorine resin comprises at least one compound selected from the group consisting of polytetrafluoroethylene, polyvinylidene fluoride, a copolymer of tetrafluoroethylene and vinylidene fluoride, a copolymer of tetrafluoroethylene and fluoroalkyl vinyl ether, and a copolymer of tetrafluoroethylene and hexafluoropropylene.

11. The polypropylene resin composition according to claim 1, wherein the compatibilizer comprises maleic anhydride-grafted polypropylene (PP-g-MAH) with a maleic anhydride graft ratio of 0.01 to 20 parts by weight.

12. The polypropylene resin composition according to claim 1, wherein the compatibilizer has a melt index of 80 to 150 g/10 min.

13. The polypropylene resin composition according to claim 1, wherein the polypropylene resin composition has a tensile strength of 80 MPa or more.

14. The polypropylene resin composition according to claim 1, wherein the polypropylene resin composition has an impact strength of 7.5 kJ/m² or more.

15. A polypropylene resin composition comprising, based on a total weight thereof:
   a highly crystalline polypropylene resin at 20 to 50 wt % of the total weight, the highly crystalline polypropylene resin having an isotactic pentad fraction, measured according to the $C^{13}$-NMR method, of 96% or more and having a melt index of 20 to 50 g/10 min;
   a highly flowable polypropylene resin at 5 to 15 wt % of the total weight and having a melt index of 500 to 1000 g/10 min;
   a glass fiber at 10 to 35 wt % of the total weight, the glass fiber having an average diameter of 5 to 15 μm and an average length of 1 to 16 mm;
   a glass wool at 1 to 5 wt % of the total weight, the glass wool having an average diameter of 1 to 6 μm and an average length of 30 to 300 μm;
   a phosphate flame retardant at 15 to 25 wt % of the total weight;
   a fluorine flame retardant aid at 0.1 to 0.4 wt % of the total weight; and
   a compatibilizer at 1 to 4 wt % of the total weight.

16. The polypropylene resin composition according to claim 15, wherein the highly flowable polypropylene resin is reformed by reaction with peroxydicarbonate.

17. The polypropylene resin composition according to claim 16, wherein the peroxydicarbonate is represented by Formula 1 below:

$$R^1\text{—}OC(O)OOC(O)O\text{—}R^2 \qquad \text{[Formula 1]}$$

in Formula 1, $R^1$ and $R^2$ are each independently $CH_3$, $C_2H_5CH(CH_3)$, $Cl_3CC(CH_3)_2$, $C_7H_{15}$, $C\text{—}C_6H_{11}CH_2$, $Cl_3Si(CH_2)_3$, $CH_3CH(OCH_3)CH_2CH_2$, $C_6H_5OCH_2CH_2$, $C_6H_5CH_2$, $Z\text{—}C_8H_{17}CH\text{=}CH$ $(CH_2)_8$, $(CH_3)_2CHCH_2CH(CH_3)$, $Cl_3C$, $CHCH(Cl)$, $ClCH_2$, $[C_2H_5OC(O)]_2CH(CH_3)$, $C_8H_{17}$, $C_2H_5$, $C_{18}H_{37}$, or 2-oxo-1,3-dioxolane-4-$CH_2$.

18. The polypropylene resin composition according to claim 16, wherein the peroxydicarbonate comprises at least one compound selected from the group consisting of diethyl peroxydicarbonate, dipropyl peroxydicarbonate, isopropyl peroxydicarbonate, dibutyl peroxydicarbonate, diethylhexyl peroxydicarbonate, dioctyl peroxydicarbonate, ditetrabutyl-cyclohexyl peroxydicarbonate, dimyristyl peroxydicarbonate, and dicetyl peroxydicarbonate.

19. The polypropylene resin composition according to claim 16, wherein a content of the peroxydicarbonate is from 0.05 to 5 parts by weight based on 100 parts by weight of the highly flowable polypropylene resin.

20. The polypropylene resin composition according to claim 15, wherein:
   the phosphate flame retardant comprises polyphosphate or piperazine acid polyphosphate;

the fluorine flame retardant aid comprises a mixture of a fluorine resin and a methyl methacrylate polymer; and the compatibilizer comprises maleic anhydride-grafted polypropylene (PP-g-MAH) with a maleic anhydride graft ratio of 0.01 to 20 parts by weight and has a melt index of 80 to 150 g/10 min.

\* \* \* \* \*